United States Patent [19]
Reuter et al.

[11] Patent Number: 5,918,433
[45] Date of Patent: Jul. 6, 1999

[54] LAY-IN WIREWAYS FOR A SPACE DIVIDER SYSTEM

[75] Inventors: Robert E. Reuter, East Setauket, N.Y.; Wallace C. Bullwinkle, Norristown, Pa.; R. Douglas Reuter, Stony Brook, N.Y.

[73] Assignee: Knoll, Inc., East Greenville, Pa.

[21] Appl. No.: 08/837,595

[22] Filed: Apr. 21, 1997

Related U.S. Application Data

[62] Division of application No. 08/461,200, Jun. 5, 1995.

[51] Int. Cl.⁶ ..................................................... E04B 2/78
[52] U.S. Cl. ........................................................... 52/220.7
[58] Field of Search ................................... 52/220.7, 239, 52/241, 582.1; 439/215, 216

[56] References Cited

U.S. PATENT DOCUMENTS

| | | |
|---|---|---|
| 3,374,590 | 3/1968 | Kessler . |
| 3,377,756 | 4/1968 | Polhamus ................................. 52/220.7 |
| 3,823,251 | 7/1974 | Heithecker et al. . |
| 3,831,330 | 8/1974 | Jacke et al. . |
| 3,856,981 | 12/1974 | Boundy . |
| 4,060,294 | 11/1977 | Haworth et al. . |
| 4,406,101 | 9/1983 | Heidmann . |
| 4,437,716 | 3/1984 | Cooper . |
| 4,567,698 | 2/1986 | Morrison . |
| 4,593,505 | 6/1986 | Russell . |
| 4,631,881 | 12/1986 | Charman . |
| 4,685,255 | 8/1987 | Kelley . |
| 4,716,698 | 1/1988 | Wilson et al. . |
| 4,762,072 | 8/1988 | Boundy et al. . |
| 4,795,355 | 1/1989 | Dorn et al. . |
| 4,841,699 | 6/1989 | Wilson et al. . |
| 4,862,659 | 9/1989 | Wilson et al. . |
| 4,907,384 | 3/1990 | Underwood . |
| 5,003,740 | 4/1991 | Dull et al. . |
| 5,024,030 | 6/1991 | Morrison . |
| 5,025,603 | 6/1991 | Johnson . |
| 5,065,556 | 11/1991 | DeLong et al. . |
| 5,081,808 | 1/1992 | Bastian et al. . |
| 5,116,235 | 5/1992 | Nienhuis et al. . |
| 5,129,835 | 7/1992 | DeFouw et al. . |
| 5,175,969 | 1/1993 | Knafu et al. . |
| 5,277,005 | 1/1994 | Hellwig et al. . |
| 5,394,658 | 3/1995 | Schreiner et al. ..................... 52/220.7 |
| 5,487,246 | 1/1996 | Hodges et al. . |
| 5,675,949 | 10/1997 | Forslund et al. ........................ 52/220.7 |

*Primary Examiner*—Michael Safavi
*Attorney, Agent, or Firm*—Buchanan Ingersoll, P.C.

[57] ABSTRACT

A network of electrical raceways primarily for carrying telephone and data cable wires extends in vertical and horizontal directions through a modular partition system and enables vertical and horizontal lines such as signal wires to be inserted and removed from the surface of horizontal and vertical channel members. Vertical raceways are provided by a vertical spine attached between adjacent panels. The vertical raceways have resilient elongated tubes with a longitudinal slit forming a seam, with resilience and stiffness sufficient to retain any enclosed wires. The tube is deflectable to permit manual, forcible insertion and removal of the wires into and out from the vertical wireway. Splicing fixtures continue the raceways around vertical to horizontal diversions, also being accessible from the surface.

12 Claims, 12 Drawing Sheets

LAY-IN WIREWAYS FOR A SPACE DIVIDER SYSTEM

This application is a Division of Ser. No. 08/461,200, filed Jun. 5, 1995.

BACKGROUND OF THE INVENTION

1. Field of the Invention

The invention relates to wire raceways (or wireways) for routing electrical conductors and the like in space-dividing modular panel systems, such as generally disclosed in U.S. Pat. No. 5,024,030. More particularly, the invention concerns a network of horizontal and vertical wireways that allow lay-in insertion of wires such as telephone lines, data cables, power cables, or other elongated means such as gas or fluid tubing. Lay-in insertion eliminates the burden of partially disassembling a modular panel installation to change or reconfigure the routing of telephone, data cable or other lines.

2. Prior Art

FIGS. 1–4, labelled prior art, show a conventional modular panel system 20. This system and others having similar characteristics are popular for dividing or partitioning areas of open floor space in commercial, institutional or residential buildings. Open space is partitioned, for example, into office cubicles 22, and can be furnished with desks, cabinets, shelving or the like, which typically connect structurally to the panels.

In FIG. 2, a left panel 24 and a central panel 26 can be connected in coplanar arrangement using an intervening vertical standard 28. Vertical standard 28 has means for engaging panels 24, 26, such as opposed clamping brackets 30 at the ends of standard 28. Clamping brackets 30 secure panels 24 and 26 at their top and bottom corners. The central panel 26 in FIG. 2 is also connected at a right angle to a right panel 32 via an arrangement of two vertical standards 28 and a corner post 34. The vertical standard 28 shown is limited to connecting two panels in a planar configuration, but corner post 34 permits connecting two or more panels together in L-, T- or cruciform-shaped configurations (only an L-shaped configuration shown). Angles other than perpendicular are also possible using a suitable shape for post 34. The exemplary modular panel system 20 shown in FIG. 2 does not require permanent attachment to the floor, each panel resting on a pair of feet 36.

FIGS. 3 and 4, show a conventional horizontal channel member 38 that can be incorporated in partitions according to FIGS. 1 and 2. In FIG. 3, horizontal channel member 38 extends along the bottom of a panel 24 and a continuation fixture 40 spans across the beneath vertical standard 28 toward the next adjacent horizontal channel member 38. The sectional view in FIG. 4 shows channel member 38 subdivided into four areas. Two upper areas 42 are sized to house and to isolate electrical bus bars (not shown) for standard 120 VAC power distribution. As shown in FIG. 3, one or more standard 120 VAC outlets can be provided on either or both sides along horizontal channel 38, tapping into bus bars mounted in the upper areas 42 of channel member 38. The sides of channel member 38 at upper areas 42 are defined by cover plates 44, which semi-permanently enclose the upper areas 42 after any required power bus bars, pre-wired networks including outlet boxes, or the like, are installed.

The lower areas 46 of horizontal channel 38 as shown in FIG. 4 are provided for telephone lines, data cables and the like, indicated as W and shown in broken lines. Lower areas 46 remain permanently open by design, and are intended for lines that do not present a shock hazard. However, their arrangement at the bottom of panel 24 is such that areas 46 do not appear open from normal viewing angles.

Keeping areas 46 permanently open is advantageous for lay-in insertion of wires such as telephone and data cables, and for removing or rearranging them later. Rearranging telephone and data lines may be desirable, for example, when reconfiguring a partitioned area to suit a different worker or to support additional equipment. Lay-in wireways in the horizontal channel member eliminate the need to disassemble modular panel 20 merely to add, reconfigure or move the terminations of telephone and data cables. Telephone and data cables are many times more likely to be reconfigured than power distribution lines, which are routinely needed at a spacing suited for plugging in a worker's equipment such as typewriters, computers, adding machines and other appliances.

Problems are encountered with conventional modular panel installations where wires are to be routed wholly or partly in a vertical direction. Lay-in wireways as described are apt for horizontal channels along the floor but are not particularly suited for situations in which the wires run vertically. Problems also are encountered when a wireway or a wire path must pass across a standard and/or around a corner post, especially if the intersection is through a horizontal/vertical diversion. Vertical runs may be desirable for various reasons including ceiling wiring connections, fixtures or connectors at different elevations, etc. Frequently, notwithstanding the lay-in horizontal runs, the wires nevertheless must be fished and drawn through openings or around diversions endwise. It would be advantageous if a wireway arrangement could better accommodate these and other practical problems in the field of modular partitions and similar structures.

It would also be advantageous if an improved wireway configuration could be devised for these solutions, that does not require substantial structural changes to the basic partition structure, and as a result can be retrofit or applied to existing modular panel structures being newly installed.

SUMMARY OF THE INVENTION

It is an object of the invention to provide a lay-in type wireway for a modular space-dividing system that is apt for vertical runs of wires, tubing or the like.

It is an alternate object of the invention to provide, for modular space-dividing systems, a network of intersecting, lay-in wireways extending in both the vertical and horizontal directions.

It is a further object of the invention to provide a vertical lay-in type wireway with a resilient strip acting as a closure for the vertical wireway with a normally closed rest position sufficiently biased to stably retain wires in the vertical wireway against falling out under their own weight.

It is another object to arrange channel members meeting the foregoing objects that can simply be mounted onto an existing modular space-dividing system, and such that the channel members mate with existing structural components of the space-dividing system.

These and other objects are accomplished according to the invention using sets of channels members that attach to modular panel space-dividing systems, including conventional systems as described above. The sets of channels comprise at least one vertical spine and one or more horizontal channels, depending whether one or both of the top and bottom edges of the modular panels are to be outfitted with horizontal channels.

The vertical spine is clamped to a side edge of modular panel via clamping brackets carried on the ends of elongated standards. The vertical spine has opposite front and back open channels extending vertically, such that the channels define vertical raceways for electrical wiring, tubing or the like. The horizontal channels have locking or clip-on projections that snap together with the lower (and/or upper) edge of the modular panel, as desired. The horizontal channels have open channel portions extending horizontally so as to define a horizontal lay-in wireways.

A resilient strip is attached into the channels, e.g., on the front and back for opposite channels. The resilient strips are elongated and arranged substantially to cover the open channels in the spine. The resilient strips and the walls and backs of the channels substantially define a vertical wireway. Each resilient strip forms an unsealed seam substantially closing the respective channel. The resilient strip has a normally closed position bearing against the open front of the channel and has sufficient stiffness to retain any enclosed wires. The resilient strip is deflectable for insertion and removal of the wires into and out from the vertical wireway through the unsealed seam and closes back over the channel.

The sets of channels can include sets of splice-fixtures to interconnect the vertical spine with one or the other of the top and bottom horizontal channels. The splice-fixtures define intersections of vertical and horizontal wireways to continue the wire path through diversions or the like.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 5:
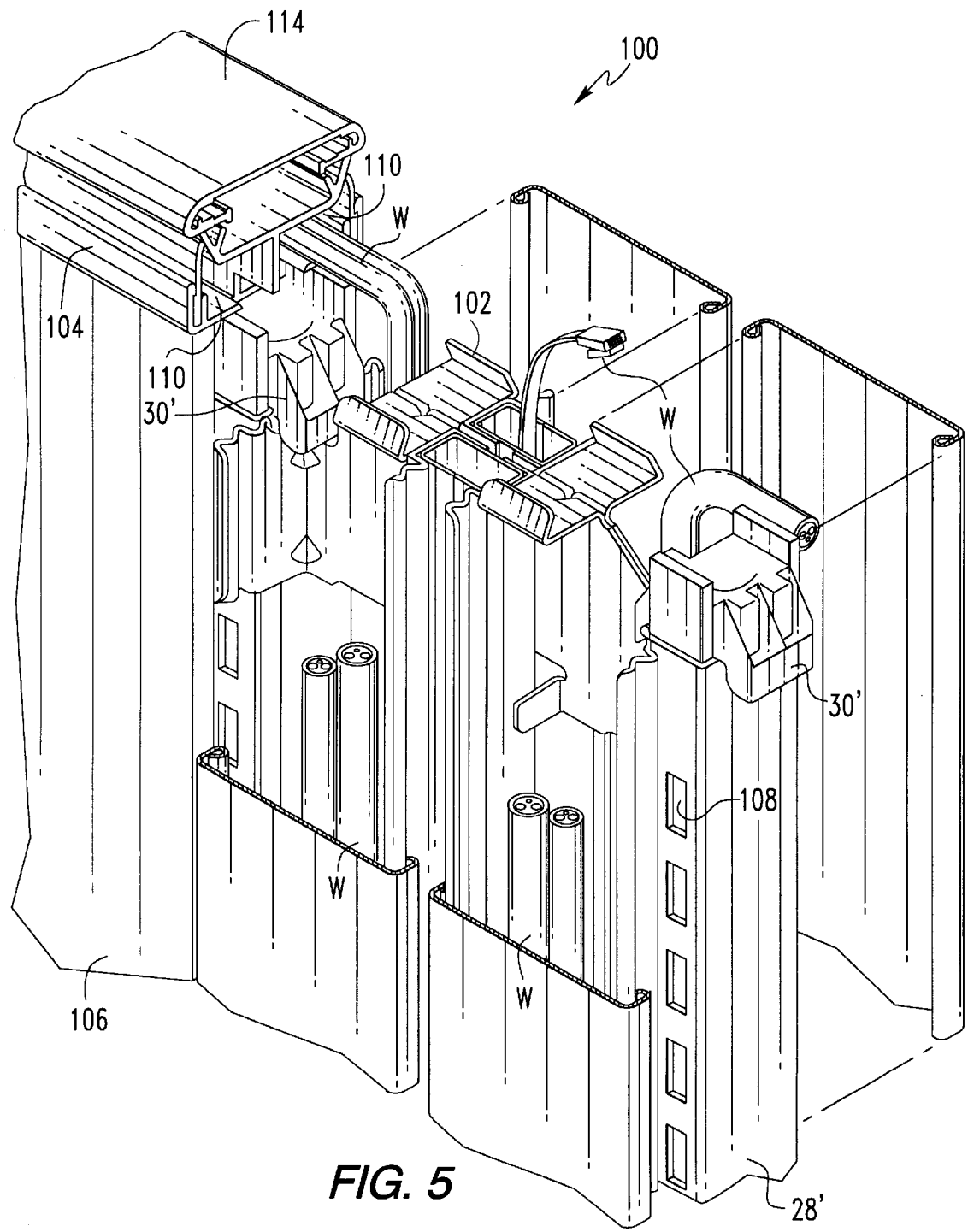
FIG. 5 is a perspective view, partly broken away, of vertical and horizontal wireways in accordance with the invention, for new or retrofit modification of a modular space-dividing system, for example of the type shown in FIG. 1.

The invention concerns a vertical and horizontal lay-in type wireway arrangement that can be applied to new modular partition systems or known systems, an example of a known system being shown in FIGS. 1–4, labelled "prior art." According to the invention, as shown in FIG. 5, a network of lay-in wireways 100 is partly achieved by a spine-weldment 102 defining vertically extending wireways and a top channel 104 defining horizontally extending wireways. A panel is shown placed to flank the left side (in FIG. 5) of the spine weldment 102. Terms such as 'left' or 'right' or 'front' or 'back' are of course relative to one's vantage point and are used for convenience in discussing the exemplary embodiments shown in the drawings and not as a limitation of the structure.

Figure 1:
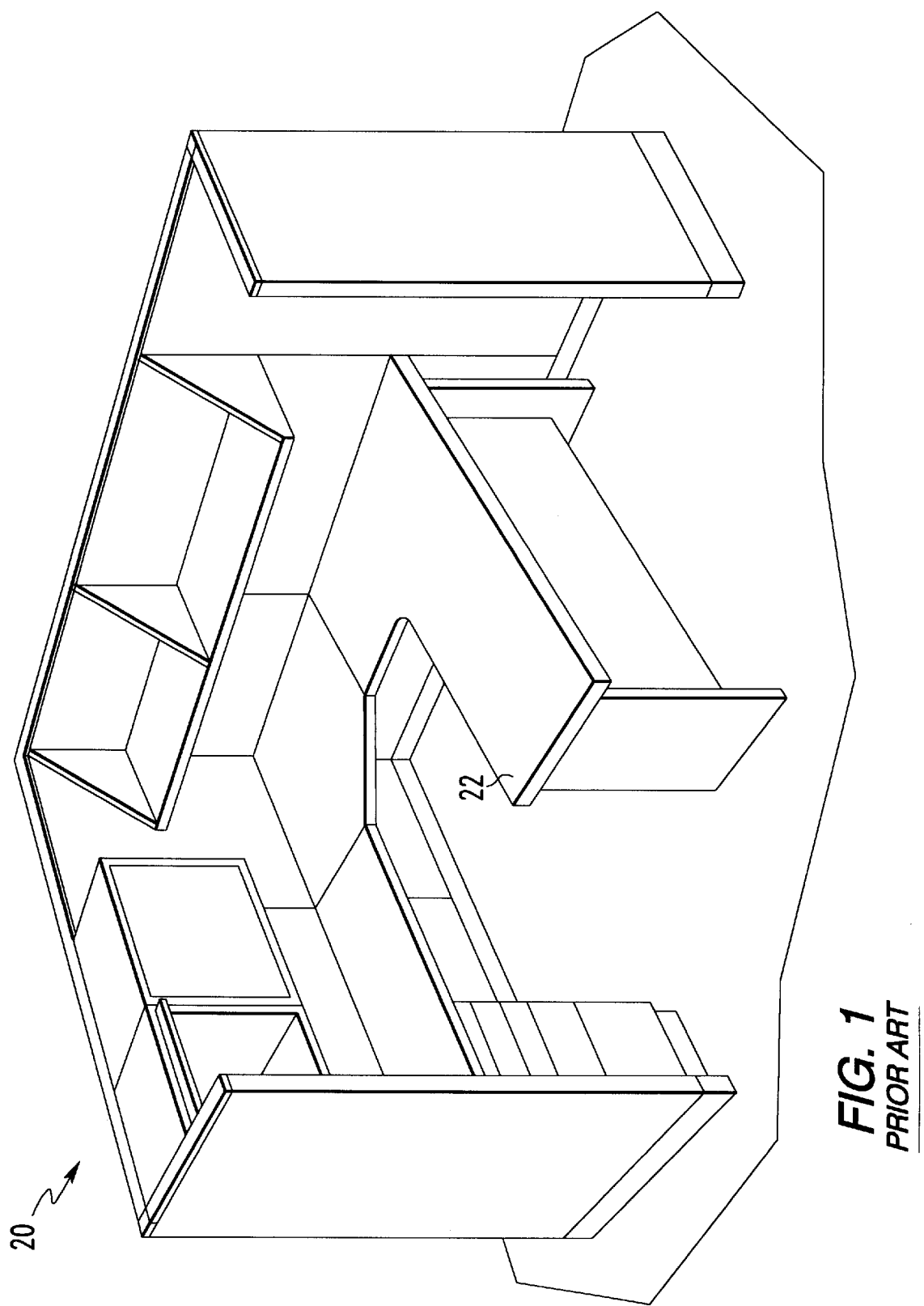
FIG. 1 is a perspective view of a modular space-dividing system of the prior art, shown partitioning an office cubicle.
Figure 2:
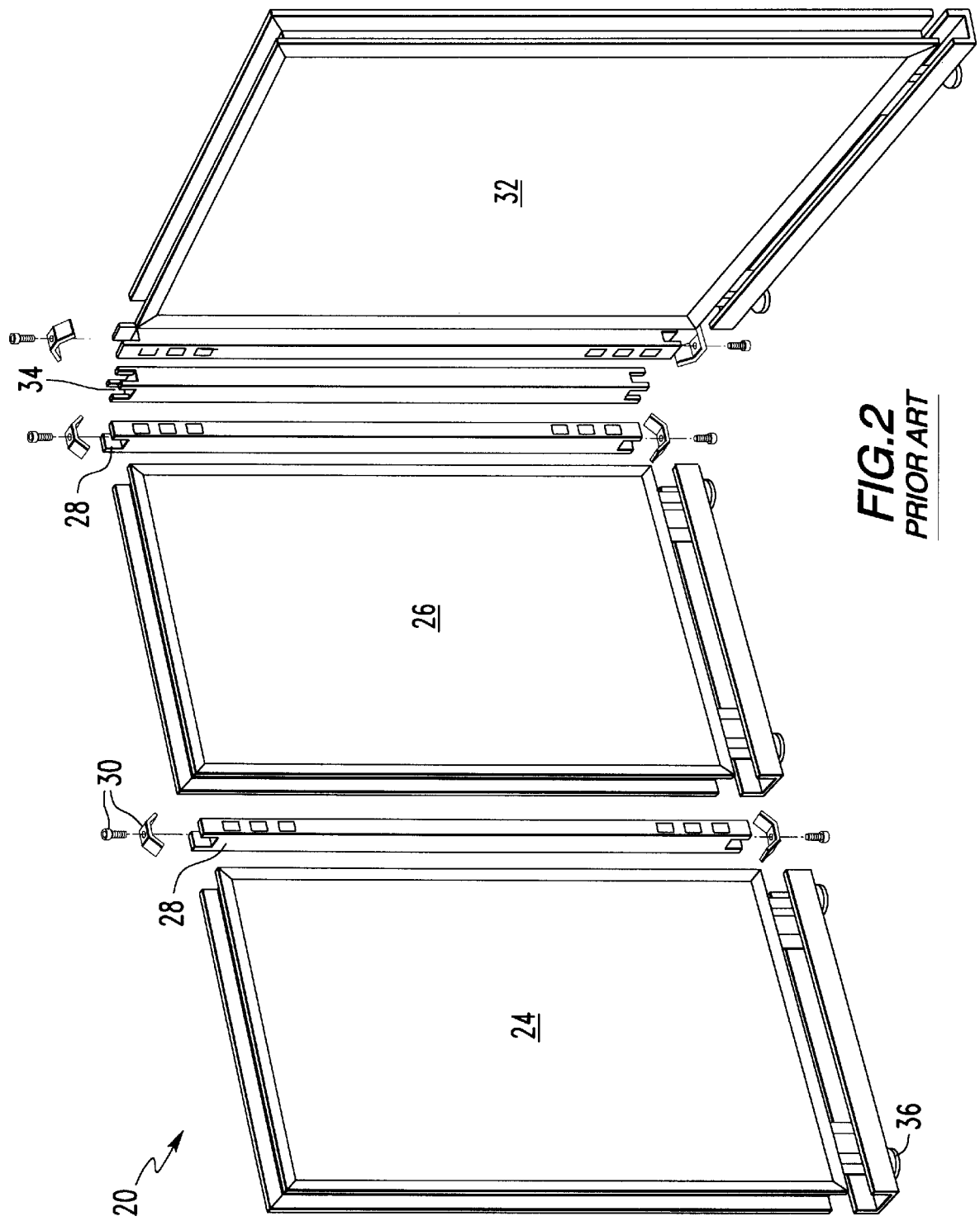
FIG. 2 is an exploded perspective view of panels and posts and the like of the modular space-dividing system of FIG. 1.
Figure 3:
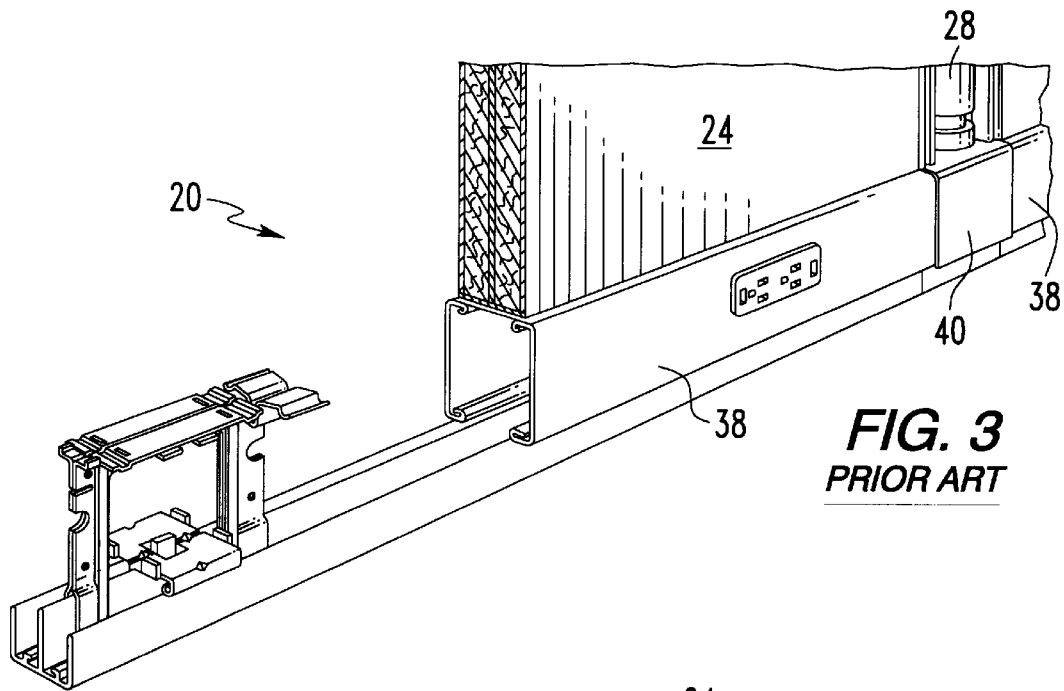
FIG. 3 is a perspective view, partly broken away, of base portions of the modular space-dividing system of FIG. 1.
Figure 4:
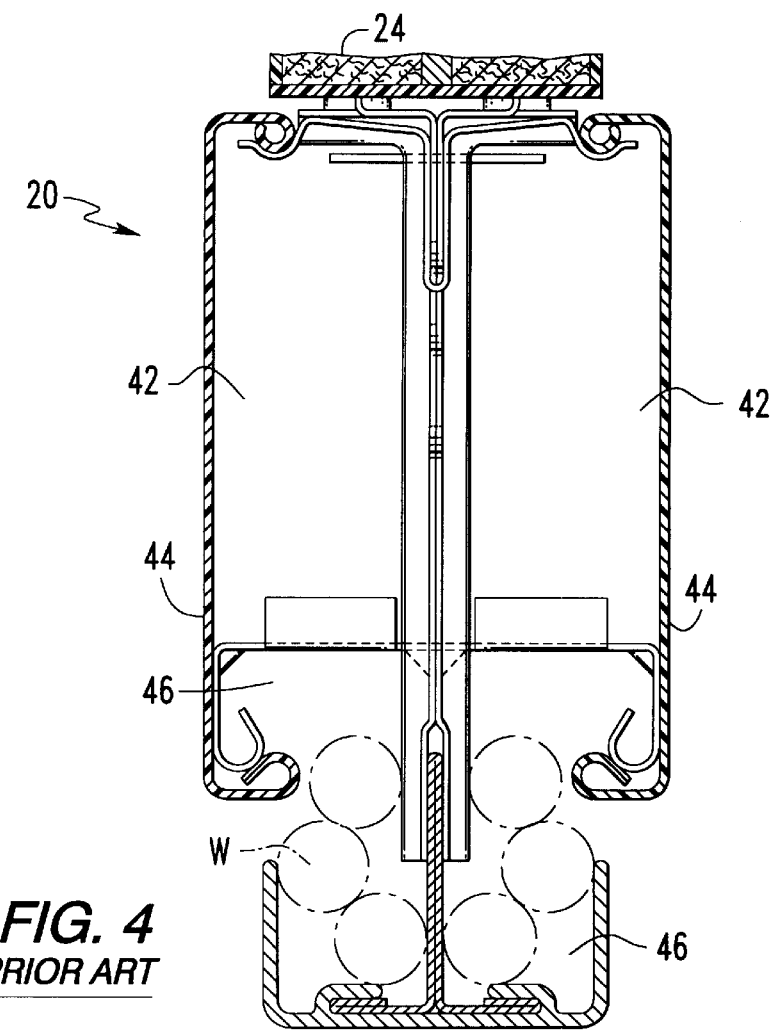
FIG. 4 is a section view taken along offset line IV—IV in FIG. 3, disclosing a wire subway in accordance with the prior art.

Spine weldment 102 as shown can be formed from separate metal pieces welded together in a unified piece. A comparable part could be formed from an extrusion or the like. Spine weldment 102 preferably interconnects between a pair of prior art panels 106 (one show in FIG. 5) of the type of which FIGS. 1 and 2 show an example. FIG. 5 shows the means of connecting the spine weldment 102 with one panel 106 as achieved by use of a vertical standard 28', comparable to the standards 28 illustrated in FIG. 2. FIG. 5 shows two standards 28' flanking the spine weldment 102. These standards 28' have opposite ends terminating in clamping brackets 30', only the top being shown. The clamping brackets 30' can be tightened such that the spine weldment 102 and panels 106 (one being shown in FIG. 5) are securely clamped together at their corners to form a substantially rigid structure.

Modular partition panels 106 can be of standard sizes, e.g., about thirty-six inches (90 cm) wide. The spine weldment 102 can optionally be sized to be six-inches (15 cm) wide for a coplanar panel connection so that, in combination with a modified, thirty inch (75 cm) wide panel (not shown), a standard thirty-six inch (90 cm) spacing between standards 28' can be maintained. Spacing the standards 28' regularly at intervals, for example, of thirty-six inches (90 cm), as shown, is desirable for coupling cabinets, shelving and the like to the vertical standards for configuring work areas such as that shown in FIG. 1, in which over-counter cabinets and shelves are hung on the standards 28 via rear-side hooks (not shown) arranged to latch into complementary apertures formed in the standards. FIG. 5 shows the standards 28' formed with a vertical row of apertures 108, as apertured for the purpose of hanging cabinets, shelving and so on at a selected height. A coplanar configuration of panels is merely an example, and with sufficient clearance provided, right angles or other angles can also be used to form rectangular or angular corners in the floorplan.

The top or cap channel 104 shown in FIG. 5 is a segment of an aluminum extrusion cut to a length coextensive with the top edge of panel 106. Top channel 104 is inserted between the top edge of panel 106 and a strip of decorative mold-trim 114, and interconnects the top edge of panel 106 and mold-trim 114 together while providing a slight space. Top channel 104 has a cross-sectional shape that defines a pair of opposite channel portions that form wireways 110 for carrying wires parallel to the top edge of panel 106.

Figure 6:
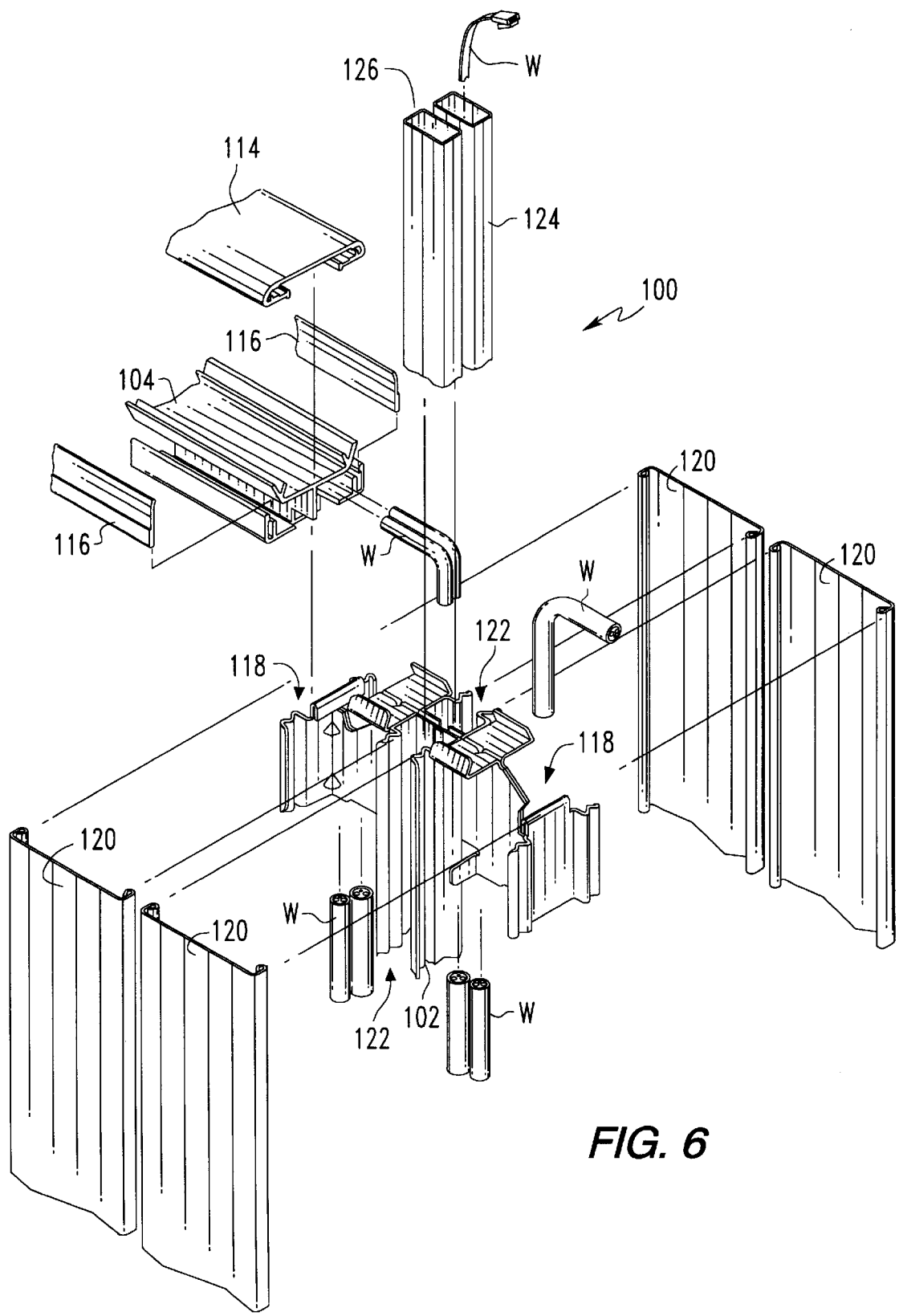
FIG. 6 is an exploded view of a modular panel system in which the panel and vertical standards have been removed.

FIG. 5 shows telephone and data cable wires W as an example of how such wires or lines can be arranged at an intersection between the vertical wireways in the spine weldment 102 and the horizontal wireways 110 in top channel 104, with the parts substantially assembled. FIG. 6 shows the various seals and decorative mold-trims in an exploded view.

Top channel 104 securely retains a strip of a decorative mold-trim 114. For this purpose, top channel 104 is shaped so that the locking projections it presents to mold-trim 114 are the same as those on the top edge of panel 106. Thus mold-trim 114 can snap-on to the top channel 104 between the original parts. Top channel 104 carries an opposite pair of flexible seals 116 that when assembled cover over the access to the lay-in wireways 110. Flexible seals 116 engage in grooves in top channel 104 along the bottom edges of seals 116, and at their top edges bear laterally against top channel 104. Seals 116 resiliently retain wires inserted into wireways 110 (see also FIG. 5) while permitting them to be laid in or pulled out manually.

According to an inventive aspect, spine weldment 102 can be formed with six vertical channels. Four channels 118 are of relatively the same size and occupy diametrically opposite positions at four corners of spine weldment 102. These channels 118 are large enough to encompass standard 120 VAC bus bars (see FIG. 13). Each of the bus bar channels 118 is covered by a releasably attachable cover plate 120. The cover plates 120 preferably are interchangeable with one another.

Figure 7:
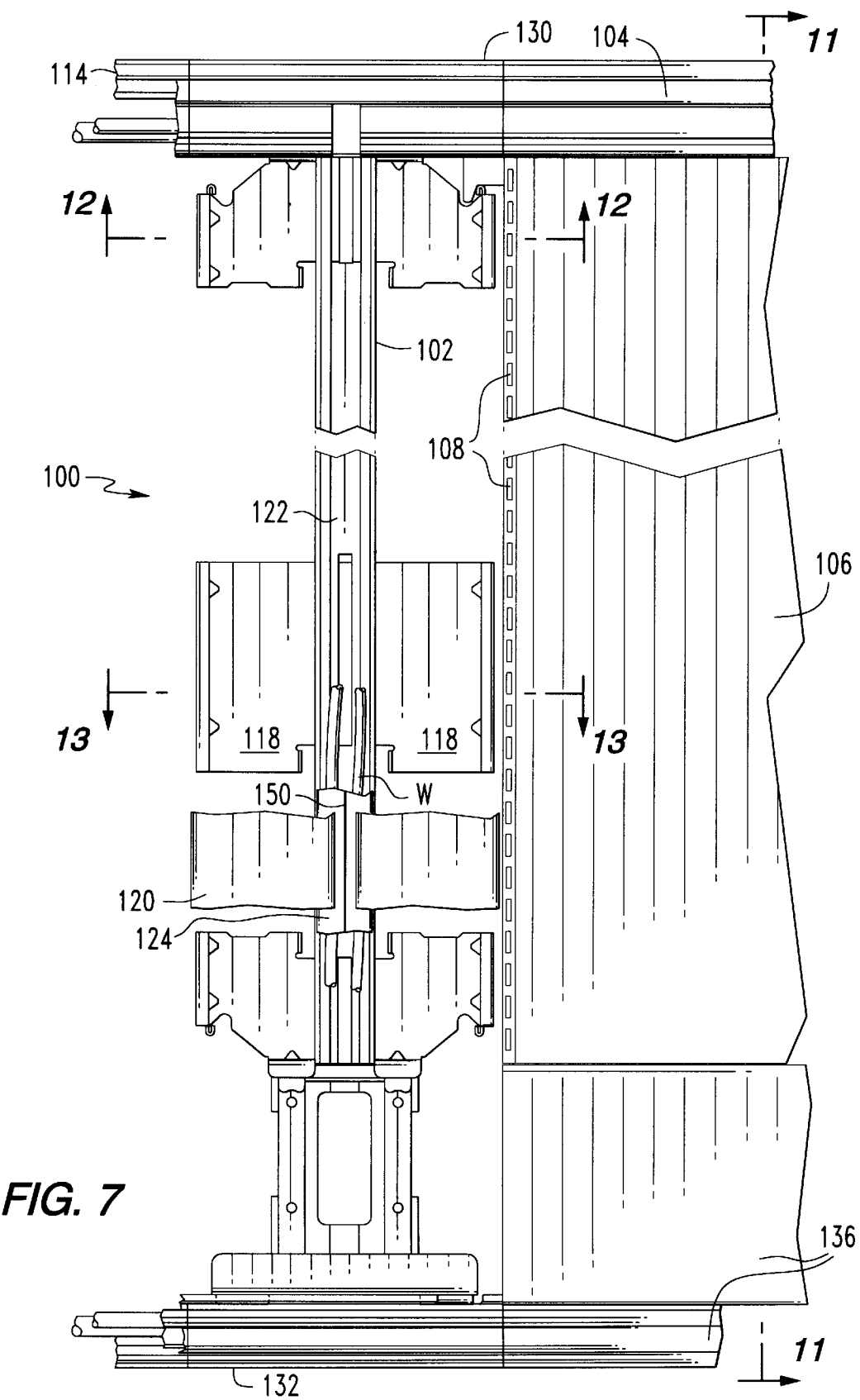
FIG. 7 is a reduced scale, front elevation view of the vertical and horizontal wireways in accordance with the invention, portions of which are shown by FIG. 5.

Spine weldment 102 has two relatively-smaller channels 122. FIG. 7 shows a 'front' face of spine weldment 102. The smaller channel 122 seen in FIG. 7 is flanked by two bus bar channels 118. This smaller channel 122 can be lined with a slit resilient seal strip 124, as also shown in FIG. 6. In FIG. 6, a telephone wire W is shown positioned for insertion in one of the liner/seal strips 124, and in FIG. 7 two lengths of wire W are shown. The smaller channels 122, in combination with the seal strips 124, define vertically extending, lay-in wireways 126 in accordance with the invention, for insertion of telephone and data cable wires W.

Figure 9:
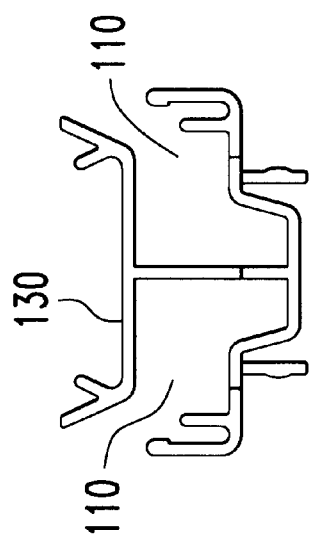
FIG. 9 is a side elevation view thereof.
Figure 8:
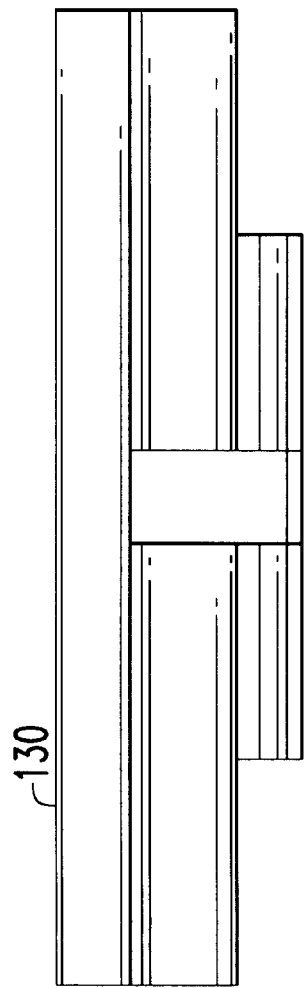
FIG. 8 is an enlarged scale, front elevation view of a splice-fixture according to a preferred embodiment, that caps the spine weldment in FIG. 7.
Figure 10:
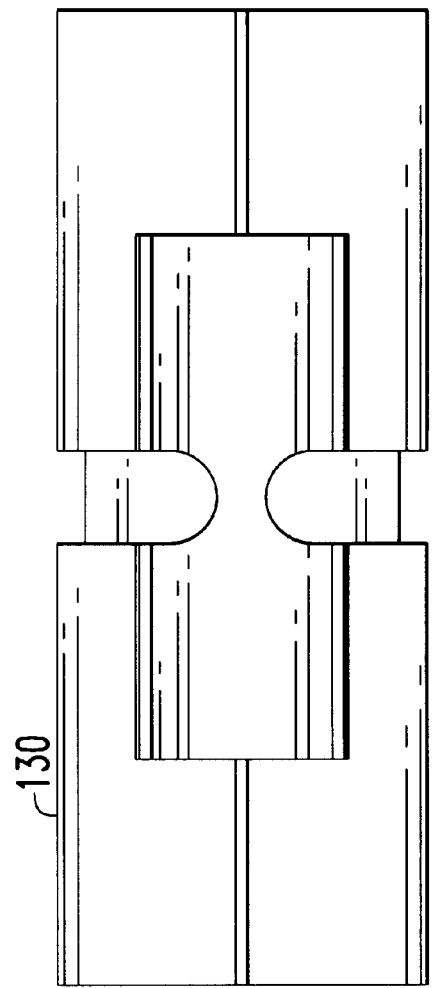
FIG. 10 is a bottom plan view.

The top and bottom ends of spine weldment 102 are abutted against and attached to top and bottom splice-fixtures 130 and 132, respectively. FIGS. 8–10 depict the top splice fixture 130 in elevation, end and plan view. FIG. 9 shows that the fixture 130 has opposite channels defining lay-in wireways accessible on opposite sides of fixture 130. Fixture 130 can be formed from a length of the same extrusion as the top channel 104, but as shown in FIGS. 8 and 10 the length of extrusion forming fixture 130 is notched and slotted laterally and vertically so that wires in the lay-in wireways can be passed along any of the four bus bar channels 118 of the spine weldment 102, or any of the two vertical wireways 126. The wires are laid into place around such angular diversions, or withdrawn, in the same manner as they are laid into the vertical and horizontal wireways, being simply passed into the channels laterally of fixture 130.

Figure 11:
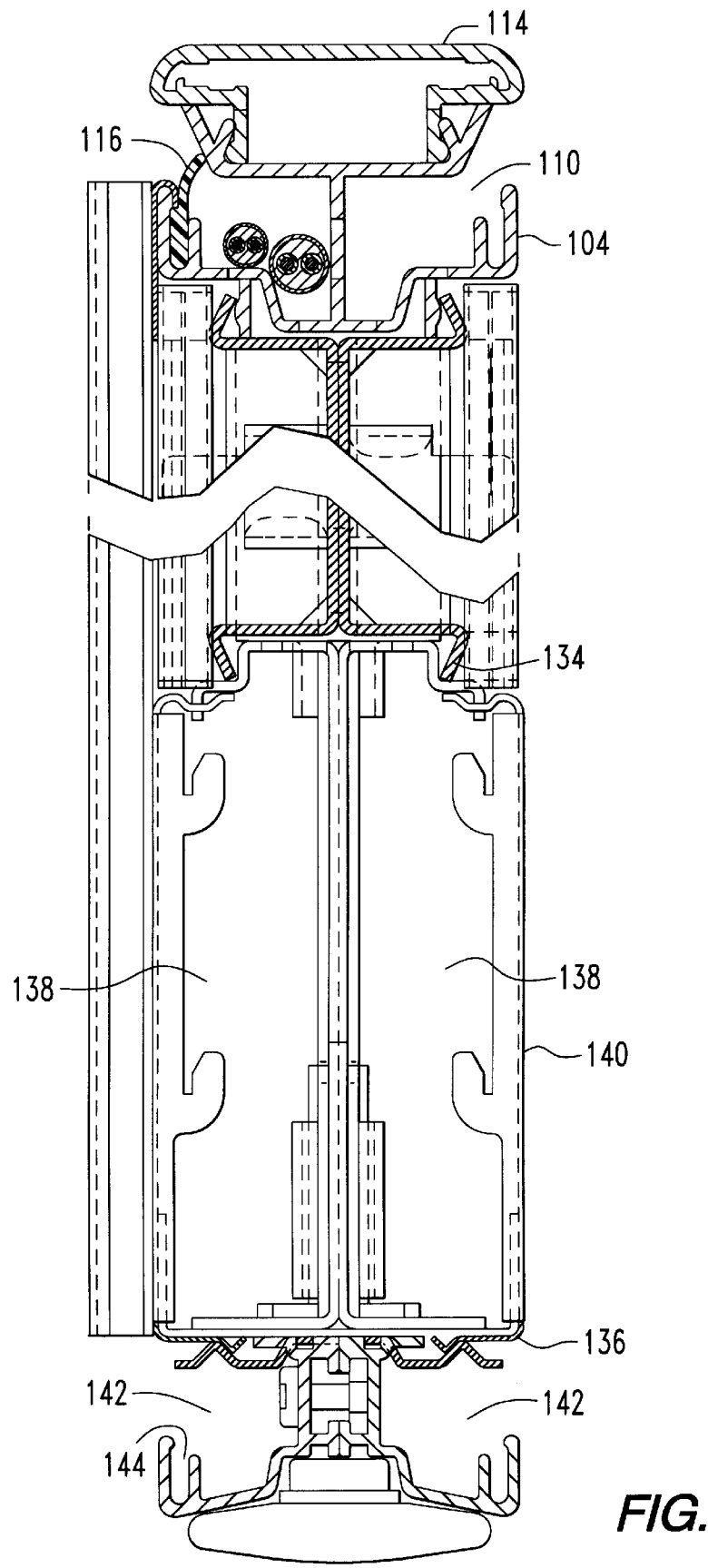
FIG. 11 is an enlarged sectional view taken in the direction of arrows XI—XI in FIG. 7.

FIG. 11 is a cut away view showing the extreme top and bottom portions of panel 106. At the lower part, a lower edge is formed with biased pinching elements 134 to grip and suspend a bottom horizontal channel member 136. The bottom horizontal channel member is subdivided into four areas. The upper two areas 138 are sized to carry electrical bus bars (not shown) for standard 120 VAC power distribution. The upper areas 138 are covered by cover plates 140 which semi-permanently enclose the upper areas 138 after installation of the 120 VAC bus bars. The lower two areas 142 define the lay-in wireways for telephone wires and data cables W and the like, not shown in this view. The lower areas 142 remain permanently open, except as deflectably closed by a resilient seal strip (not shown) fixed along one edge in a slot 144 in a manner similar to strip 116 at the top. The seal strip is resiliently deflectable to permit forcible, manual lay-in insertion or pull-out removal of telephone wires, data cables and similar lines into and out from the wireways.

Figure 12:
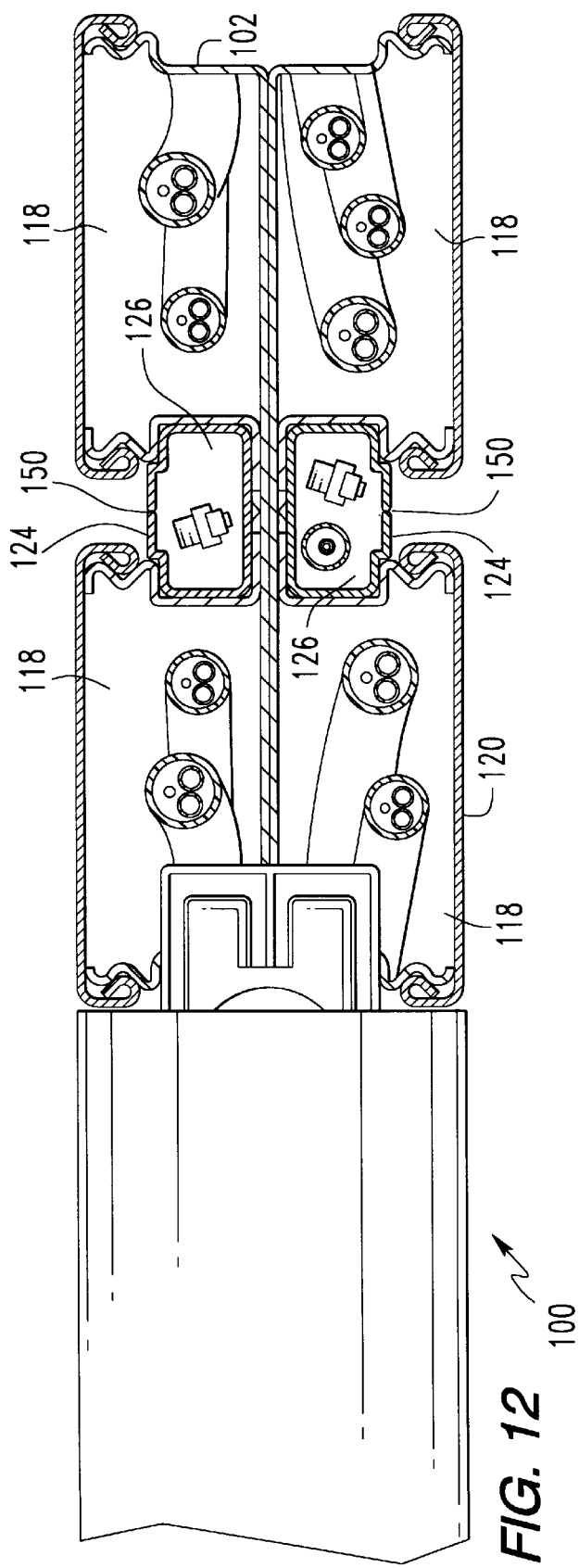
FIG. 12 is an enlarged section view taken along offset line XII—XII in FIG. 7.

The upper part of FIG. 11 depicts the top channel having upper and lower projections formed to complement the upper and lower projections of modular panel 106 and mold-trim 114, respectively. Thus top channel 104 can be added without modifications between an existing connection of a mold-trim 114 and panel 106 top-edge. The top channel 104 gives the mold-trim 114 some extra elevation but is nevertheless attractive and barely distinguishable from the appearance of the mold-trim 114 as assembled directly into panel 106 without top channel 104. FIG. 12 shows several different varieties of lines W extending out from the lay-in wireways 110 in top channel 104, and changing direction to extend down the wireways 118 and 126 in spine weldment 102. For example, power cables extend down each of bus bar channels 118. Telephone cable wires extend down vertical lay-in channels 126, and one of the lay-in channels includes a coaxial type data cable. Of course other combinations of electrical conductor types and other connecting lines can be installed where appropriate, and having been installed can be relatively easily reconfigured.

Figure 13:
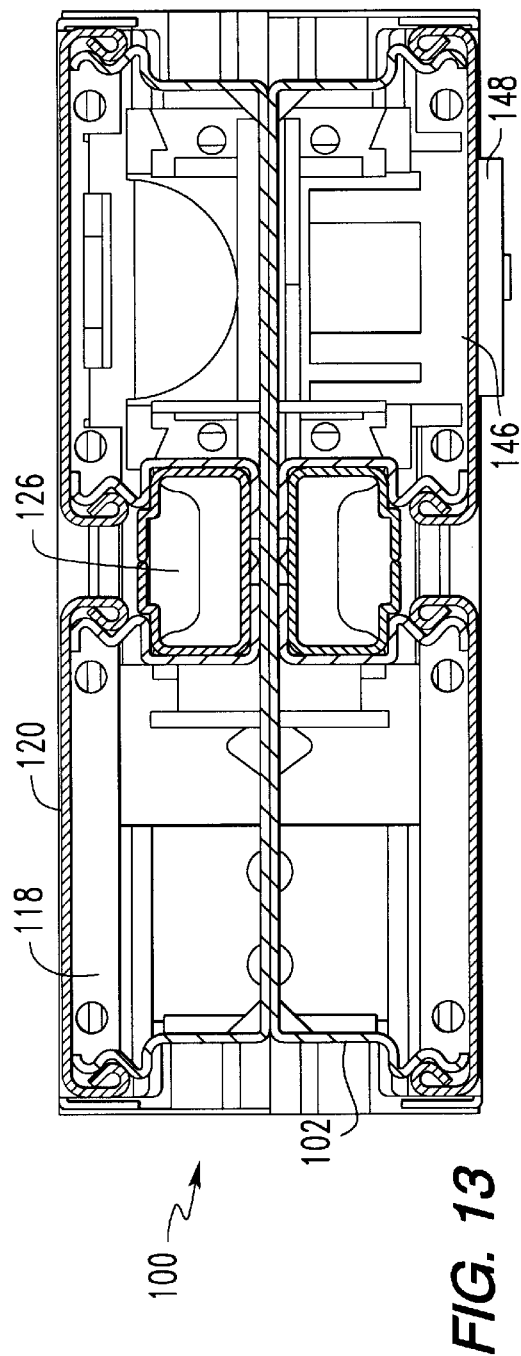
FIG. 13 is an enlarged section view taken along line XIII—XIII in FIG. 7.

With reference to FIG. 7, the bottom end of spine weldment 102 is formed to match the upper areas 138 of bottom horizontal channel member 136. This shape and arrangement of the bottom end of spine weldment 102 allows a horizontally extending bus bar (not shown) to connect with a vertically extending track (shown in FIG. 13). In FIG. 13 a vertically extending track 146 extends up to an elevation of about 28 inches (70 cm) above the floor, to terminate in a standard 120 VAC outlet 148. Comparison of FIGS. 12 and 13 shows the dual capability of bus bar channels 118 in spine weldment 102. FIG. 13 shows hard-wiring of the 120 VAC power distribution via pre-formed bus bars and tracks and the like. FIG. 12 shows channels 118 used for wiring, at least in the area of an angular diversion from a horizontal to vertical extension. Channels 118 are not inherently limited to either form of conductor and can be used for any power, telephone, data or other line that typically needs to be up or run down from the top or bottom channel about half the height of the spine weldment 102 to a connector or outlet such as an R-11, R-14, BNC or similar jack or power outlet, but conceivably could follow any path and/or length.

Figure 14:
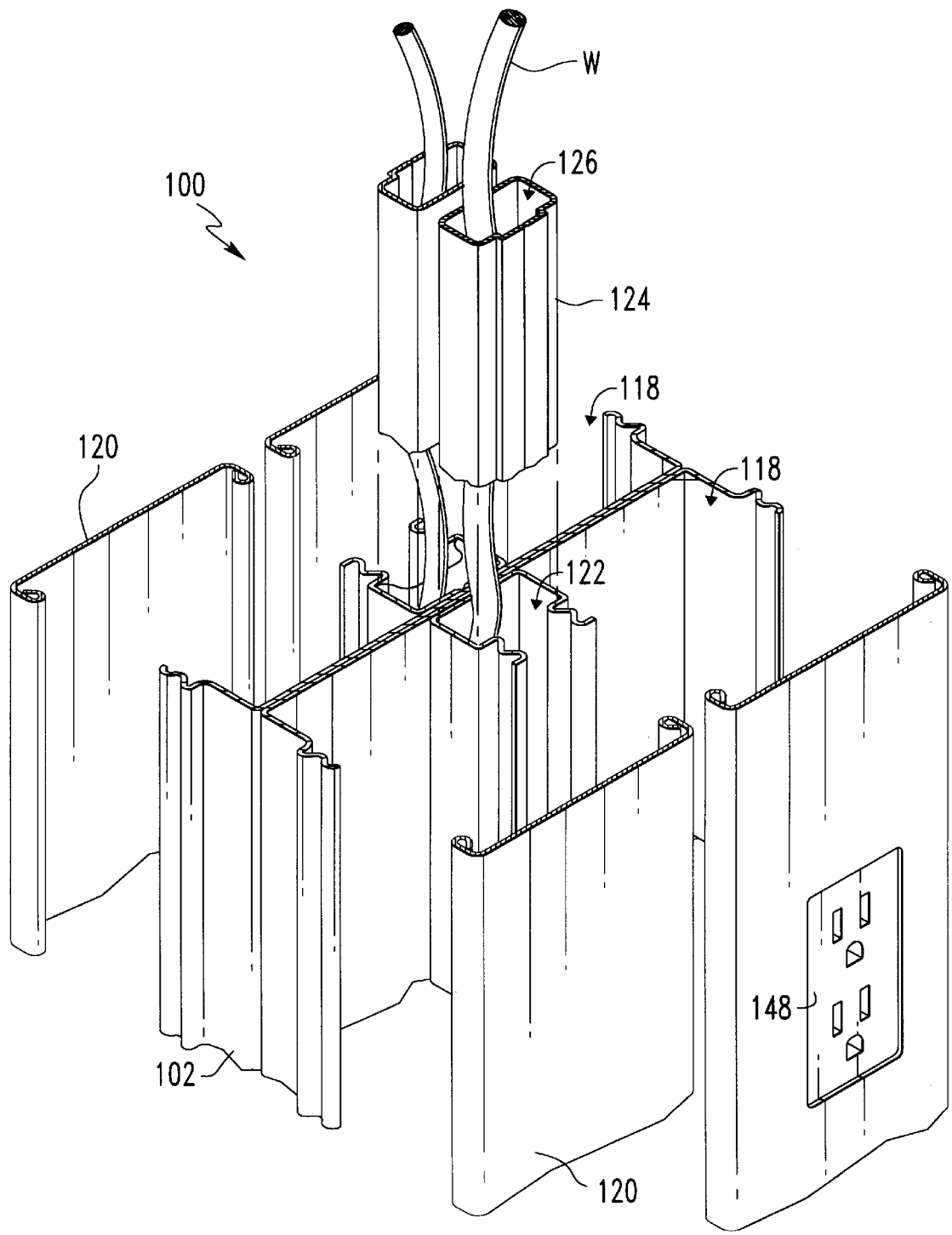
FIG. 14 is an exploded perspective view of FIG. 13, with data cables included to illustrate their insertion in the closure strips of the vertical wireways.
Figure 15:
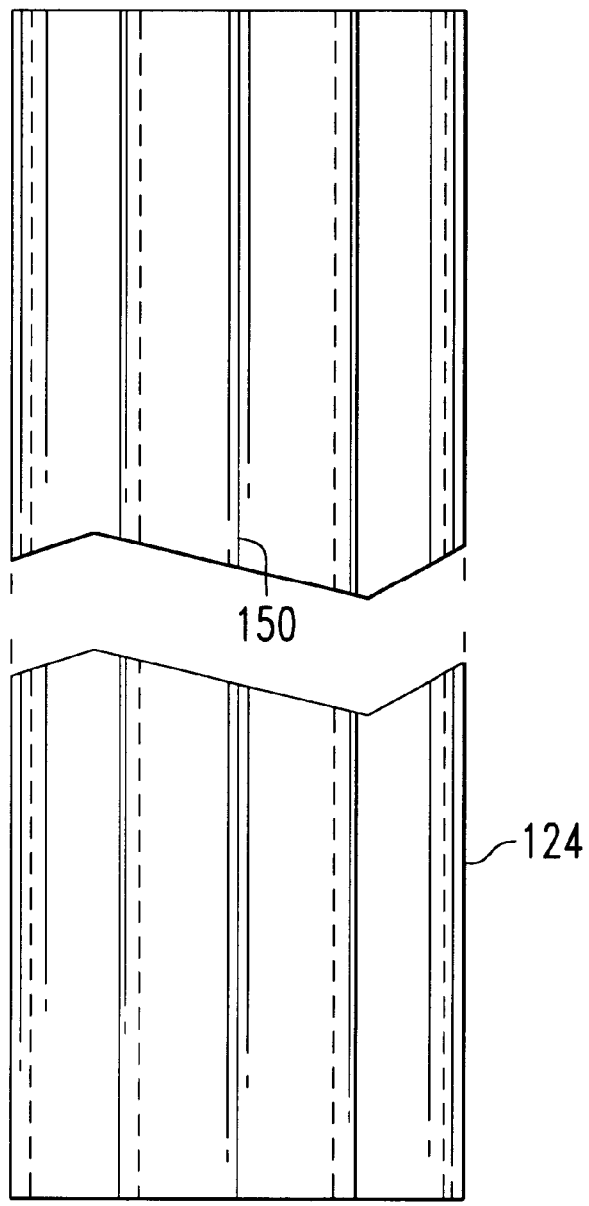
FIG. 15 is an enlarged scale, front elevation view of a closure strip in FIG. 14.
Figure 16:
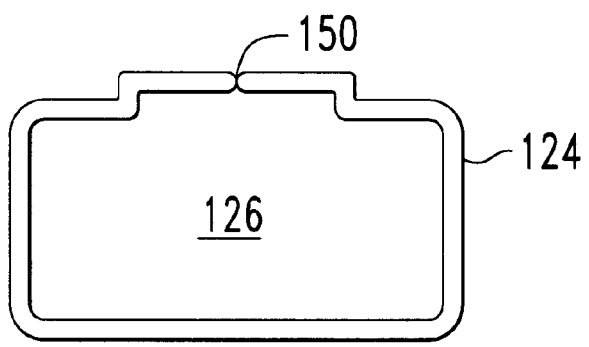
FIG. 16 is a bottom plan view thereof.

FIG. 14 shows the spatial relationship among the four bus bar channels 118 and covers 120, relative to the two lay-in wireways 122 and liners 124. FIGS. 15 and 16 provide two views of a liner 124 of the vertical lay-in wireway 126. Liner 124 can be a segment of an extruded polymer formed in a generally rectangular tubular shape. The tubular liner 124 can be formed with a longitudinal, unsealed slit or seam 150, which can be simply abutting, or overlapped or provided with an adhesive or mechanical seam fixture (e.g., zip-lock)

. The liner 124 is inserted in spine weldment 102 such that the unsealed seam 150 is accessible. The liner 124 has a normally closed state as shown, and preferably is sufficiently stiff to retain any enclosed wires. Liner 124 is also sufficiently flexible to be deflectable to permit manual, forcible insertion or removal of the wires into and out of wireway 126 as desired.

Figure 17:
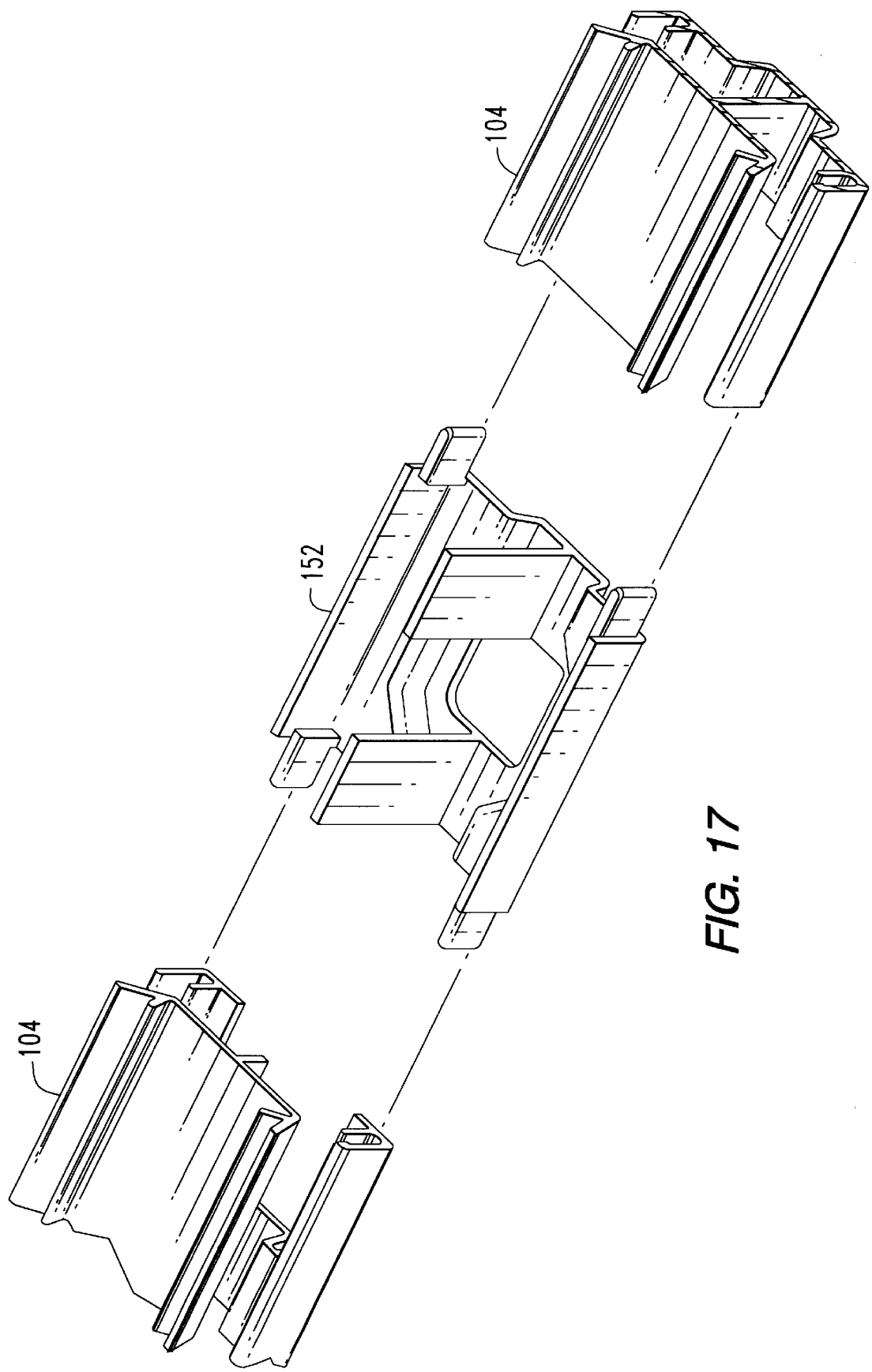
FIG. 17 is a perspective view of a splice-fixture for the invention for capping a prior art corner post (not shown, but see corner post 34 in FIG. 2).

FIG. 17 shows a top splice-fixture 152, as do FIGS. 8–10, except adapted to top an in-line post (not shown), which connects two panels in a planar span. Routine modifications can adapt the fixture 152 use atop corner posts, as 34 In FIG. 2.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A modular space dividing system comprising:

a pair of modular panels having upper and lower edges and side edges;

a first channel member connectable to the panels along the side edges thereof, and having a channel portion oriented to extend vertically so as to define a vertical wireway;

a second channel member connectable to one of the panels along the upper edge and having a cross-sectional shape that defines a pair of opposite channel portions that extend horizontally and define horizontal lay-in wireways for carrying wires parallel to the upper edge of the panel;

a third channel member connectable to the other panel along the upper edge, the third channel member having a cross-sectional shape that is identical to the cross-sectional shape of the second channel member and defines another pair of opposite channel portions that extend horizontally and define horizontal lay-in wires;

a splice fixture abutting the first, second and third channel members to define an intersection between the first, second and third channel members, the splice fixture being accessible and aligned to continue a path between the horizontal wireways of the second and third channel members above the vertical wireway of the first channel member; and a resilient strip mounted in the first channel member to substantially line the channel portion thereof to define with the vertical wireway a substantially enclosed wireway, the resilient strip forming a resiliently openable seam, and having a normally closed position respecting the vertical wireway whereby any wires enclosed in the wireway are retained, and being deflectable to permit forcible insertion and removal of the wires into and out of the vertical wireway.

2. A modular space dividing system comprising:

at least one modular panel having upper and lower edges and side edges;

a first channel member connectable to the panel along one of the side edges, and having a channel portion oriented to extend vertically so as to define a vertical wireway;

a second channel member connectable to the panel along one of the upper edge and the lower edge, and having a channel portion oriented to extend horizontally so as to define a horizontal lay-in wireway;

a splice-fixture connected to one of the first and the second channel members to define an intersection between the first and second channel members the splice fixture being accessible and aligned to continue a path between the vertical and horizontal wireways; and a resilient strip mounted in the first channel member to extend substantially covering the channel portion thereof to define with the vertical wireway a substantially enclosed wireway, the resilient strip forming a resiliently openable seam, and having a normally closed position respecting the vertical wireway whereby any wires enclosed in the wireway are retained, and being deflectable to permit forcible insertion and removal of the wires into and out from the vertical wireway.

3. The modular space dividing system of claim 2, wherein the resilient strip comprises an elongated tube with a longitudinal slit formed therein to comprise the seam.

4. The modular space dividing system of claim 3, wherein the elongated tube shape of the resilient strip closely matches a shape of the channel portion of the first member.

5. A modular space dividing system comprising:

at least one modular panel having upper and lower edges and side edges;

a first channel member connectable to the panel along one of the side edges, and having a channel portion oriented to extend vertically so as to define a vertical wireway;

a second channel member connectable to the panel along one of the upper edge and the lower edge, and having a channel portion oriented to extend horizontally so as to define a horizontal lay-in wireway; and a splice-fixture connected to one of the first and the second channel members to define an intersection between the first and second channel members, the splice fixture having a cross-sectional shape that is identical to a cross-sectional shape of the second channel member, the splice fixture further including lateral and vertical slots that are accessible and aligned to continue an unobstructed path between the vertical and horizontal wireways to permit the lay-in of wires from the horizontal wireway into the vertical wireway.

6. The modular space dividing system of claim 5, further comprising a third channel member, including means for connecting to the panel along the other of the upper and lower edges of the panel, the third channel member having a channel portion oriented to extend horizontally so as to define a horizontal lay-in wireway.

7. The modular space dividing system of claim 6, further comprising another splice-fixture connected to one of the first and the third channel members to define an intersection between the first and third channel members and to continue an unobstructed path between the vertical and horizontal wireways at said intersection between the first and third channel members.

8. A modular space dividing system comprising:

at least one modular panel having upper and lower edges and side edges;

a first channel member connectable to the panel along one of the side edges, and having a channel portion oriented to extend vertically so as to define a vertical wireway;

a second channel member connectable to the panel along one of the upper and lower edges of the panel, and having a channel portion oriented to extend horizontally so as to define a horizontal lay-in wireway; and, a resilient strip mounted in the first channel member to substantially line the channel portion thereof to define with the vertical wireway a substantially enclosed wireway, the resilient strip comprising an elongated tube with a longitudinal slit formed therein to comprise a resiliently openable seam, and having a normally closed position respecting the vertical wireway whereby any wires enclosed in the wireway are retained, and being deflectable to permit forcible insertion and removal of the wires into and out from the vertical wireway.

9. The modular space dividing system of claim 8, wherein the elongated tube shape of the resilient strip closely matches a shape of the channel portion of the first member.

10. A modular space dividing system comprising:

a pair of modular panels having upper and lower edges and side edges;

a first channel member connectable to the panels along the side edges thereof, and having a channel portion oriented to extend vertically so as to define a vertical wireway;

a second channel member connectable to one of the panels along the upper edge and having a cross-sectional shape that defines a pair of opposite channel portions that extend horizontally and define horizontal lay-in wireways for carrying wires parallel to the upper edge of the panel;

a third channel member connectable to the other panel along the upper edge, the third channel member having a cross-sectional shape that is identical to the cross-sectional shape of the second channel member and defines another pair of opposite channel portions that extend horizontally and define horizontal lay-in wires; and a splice fixture abutting the first, second and third channel members to define an intersection between the first, second and third channel members, the splice fixture having a cross-sectional shape that is identical to the cross-sectional shapes of the second and third channel members and defines horizontal, lay-in wireways which are accessible from opposite sides of the splice fixture to continue an unobstructed path between the horizontal wireways of the second and third channel members and the vertical wireway of the first channel member.

11. The modular space dividing system of claim 10, wherein the splice fixture comprises a segment of an extruded piece that forms the second and third channel members.

12. The modular space dividing system of claim 10 wherein the splice fixture includes lateral and vertical slots to permit the lay-in of the wires in the horizontal wireways of the second and third channel members into the vertical wireway of the first channel member.

* * * * *